United States Patent
Dulaney et al.

[19]

[11] Patent Number: 5,935,464
[45] Date of Patent: Aug. 10, 1999

[54] LASER SHOCK PEENING APPARATUS WITH A DIFFRACTIVE OPTIC ELEMENT

[75] Inventors: Jeff L. Dulaney; David W. Sokol, both of Dublin, Ohio

[73] Assignee: LSP Technologies, Inc., Dublin, Ohio

[21] Appl. No.: 08/927,717

[22] Filed: Sep. 11, 1997

[51] Int. Cl.⁶ .................................................. B23K 26/00
[52] U.S. Cl. ................................ 219/121.65; 219/121.73
[58] Field of Search ..................... 219/121.73, 121.75, 219/121.85, 121.65, 121.66; 148/565, 525

[56] References Cited

U.S. PATENT DOCUMENTS

| | | | |
|---|---|---|---|
| 5,103,073 | 4/1992 | Danilov et al. | 219/121.7 |
| 5,672,285 | 9/1997 | Kondo et al. | 219/121.73 |
| 5,786,560 | 7/1998 | Tatah et al. | 219/121.77 |

FOREIGN PATENT DOCUMENTS

| | | |
|---|---|---|
| 63-212084 | 9/1988 | Japan . |
| 2-187294 | 7/1990 | Japan . |
| 3-47690 | 2/1991 | Japan . |
| 6-181353 | 6/1994 | Japan . |

*Primary Examiner*—Geoffrey S. Evans
*Attorney, Agent, or Firm*—Randall J. Knuth

[57] ABSTRACT

A laser peening apparatus, including a laser generator to generate a laser beam having a first cross-sectional shape; and a diffractive optic element. The diffractive optic element changes the laser beam to a second cross-sectional shape. The apparatus also includes demagnifying and magnifying lenses. The diffractive optic element may create a second cross-sectional shape such as rectangular, hexagonal, or even split the laser beam into multiple beams. The diffractive optic element may also create a second cross-sectional shape of the laser beam varying in intensity thereacross or varying in energy distribution.

14 Claims, 1 Drawing Sheet

LASER SHOCK PEENING APPARATUS WITH A DIFFRACTIVE OPTIC ELEMENT

BACKGROUND OF THE INVENTION

1. Field of the Invention

The present invention relates to the use of coherent energy pulses as from high power pulsed lasers in the shock processing of solid materials, and more particularly to a device and method for generating a particularly formed laser beam profile for use in the process. The invention is especially used for enhancing on creating desired physical properties such as hardness, strength, and fatigue strength in solid materials.

2. Description of the Related Art

Known methods for the shock processing of solid materials, particularly known methods for the laser shock processing or peening of solid materials, typically use coherent energy from a laser beam oriented normal to a workpiece. The cross sectional shape of the laser beam may be circular for efficient laser beam creation, or for slab type laser rods, it may be rectangular.

Such circular cross sectional laser beams create circular laser peened spots on a workpiece surface when oriented normal thereto. As previously known in the art, to adequately laser shock the desired area in the workpiece, such geometry, i.e., circular, of the laser spot necessitated an overlap of adjacent laser shocked spots on the workpiece to sufficiently create a residual compressive field within the workpiece. Such overlap of the peened spots, reduces the speed of the process.

Lenses utilized within high powered laser systems have historically used only refractive lenses. Such lenses utilize a material such as glass or plastic having varying thicknesses to bend or refract the laser energy.

What is needed in the art, is the ability to change the circular cross section of the high power laser beam to that of an alternate shape, such that a majority of the laser energy created may be applied to the workpiece without substantial loss. Further, needed in the art, is an energy efficient method to alter a cross sectional shape of the incoming laser beam to permit efficient processing of the workpiece without necessitating overlap of the laser peened spots.

Also needed is a technique to provide more uniform energy distribution independent of spot shape.

SUMMARY OF THE INVENTION

According to the present invention an apparatus method is provided of laser shock processing, that can be used in a production environment to control and alter the cross sectional shape of the applied laser beam.

The invention, in one form thereof, utilizes a diffractive optic member designed to change the incoming, normally circular, cross sectional laser beam to that of a desired shape. Desired shapes may include that of a square, torus, eccentric circle, hexagon, or triangle shape. In addition, a single laser beam may be split up into multiple beams. One feature of the invention is that such diffractive optics may create a laser beam with a cross sectional shape having substantially shaped edges, particularly straight edges.

Additionally, use of diffractive optics in the present invention and method, may control the applied energy of the laser beam in which the transition area between a laser peened spot and the non-laser peened area may gradually drop in intensity, such that high residual surface tensile forces in the area about the laser peened spot may be reduced.

In another form of the invention, demagnifying and magnifying optics are utilized about the diffractive optic element to enable use of such diffractive optic elements without exceeding the element's damage threshold. Traditional diffraction gradings, have a low damage threshold of approximately 350 milijoules per centimeter squared. Other diffractive optics have different thresholds, but typically not as high as refractive optics.

An advantage of the present invention is that a laser beam with circular cross section may be formed to any desired shape to enable efficient laser processing.

Another advantage of the present invention is that utilization of diffractive optics within the laser peening system may change its spatial profile applied energy in a controllable fashion to decrease residual surface tensile forces in the laser shock peened workpiece.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
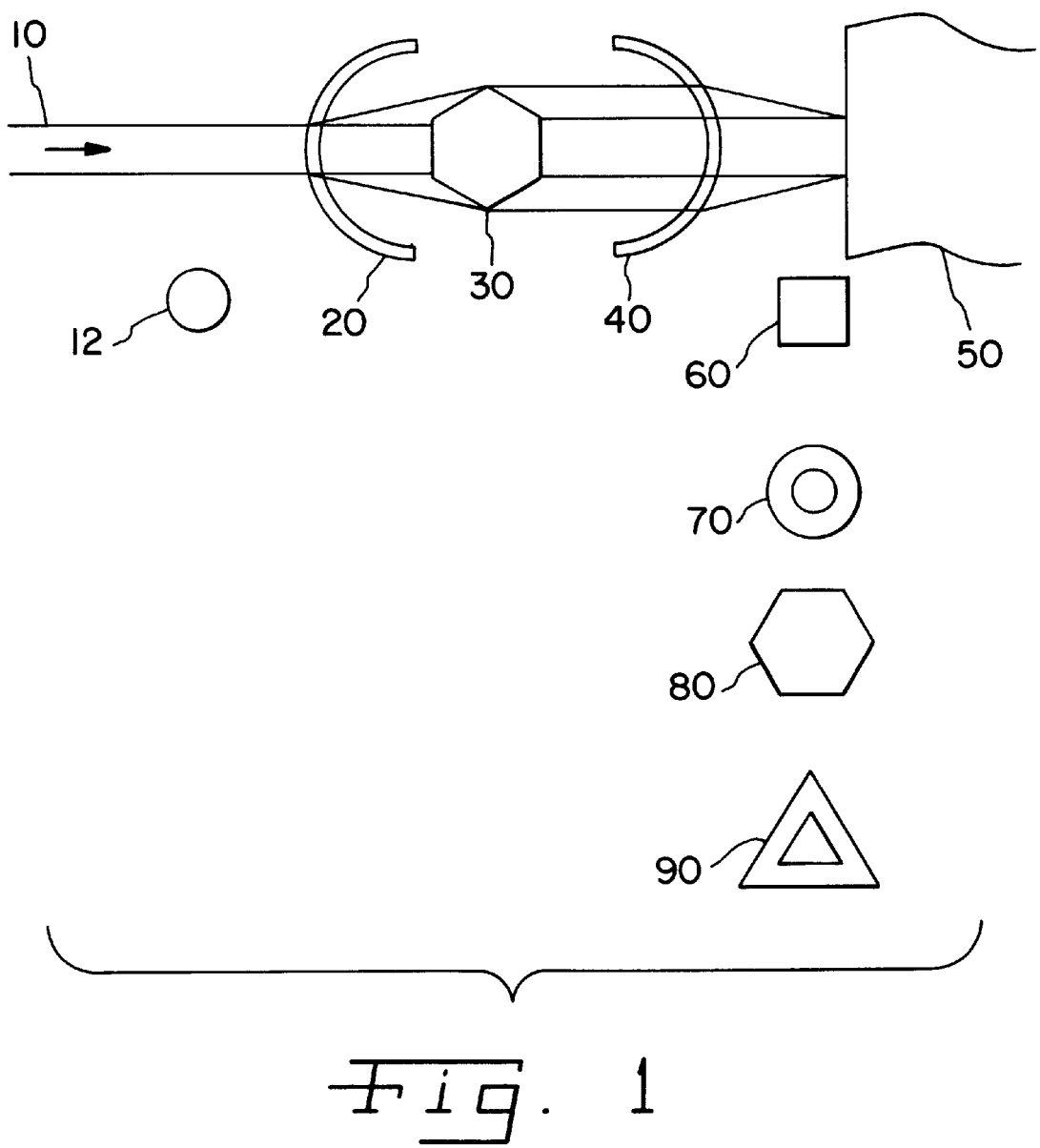
FIG. 1 is a diagrammatic view of the laser peening system of the present invention, utilizing a diffractive optic element.

The improvements in fatigue life produced by laser shock processing are the results of residual compressive stresses developed in the irradiated surface that retard fatigue crack initiation and/or crack propagation. Changes in the shape of a crack front and slowing of the crack growth rate when the crack front encounters the laser shocked zone have been shown. Laser shock processing is an effective method of increasing fatigue life in metals by treating fatigue critical regions. For a more thorough background and the prior history of laser shock processing and that of high powered processing of engineered materials, reference can be made to U.S. Pat. No. 5,131,957. This patent shows the type of laser and laser circuit adaptable for use with the present invention. Another type of laser adaptable for use with the invention, is that with a ND-Glass Laser manufactured by LSP Technologies, of Dublin, Ohio.

Use of transparent and opaque overlays is known with the standard laser shock processing or laser peening. Such descriptions of transparent and opaque laser peening overlays used with the process are not discussed here.

The present invention includes utilization of a diffractive optic element or sometimes called a binary optic to generate a custom, specific shape for laser peening. Such an optic may take a relatively uniform beam or uniformally circular beam and map such beam shape and energy distribution to any format desired.

For instance, as shown in FIG. 1, a laser (12) creates a laser beam 10 having a circular cross section as shown therebelow. Laser beam 10 passes through a demagnifying objective lens 20, thereby passing into a diffractive optic element 30. Based on the design of the diffractive optic element, to be discussed later, the altered laser beam 10 passes into a magnifying or collecting lens 40, then onto workpiece 50, which is the workpiece to be laser shock processed. Directly prior to impact with workpiece 50, laser beam 10 cross sectional shape may be that indicated as rectangular (specifically square) or that of many other shapes as indicated, such as toroidal, hexagonal, bar, and triangular.

Demagnifying and magnifying lenses 20, 40 are utilized to maintain the laser beam 10 intensity less than the maximum limit of the diffractive optic element 30. Numerous types of magnifying and demagnifying lenses may be utilized as known in the art, but the preferred lens is a spherical A/R coated lens.

Diffractive optic element 30 of the present invention works by breaking up waves of incoming light energy into a large number of waves which recombine to form a completely new wave or waves on the opposite side of optic element 30. The new waves can move in a different direction than the incoming light pulse. Additionally, diffractive optics can convert a single beam into several output beams and focus the input beam into a point or into a pattern while homogenizing or defusing the beam into a controlled area.

Diffractive optics break-up the light waves by forcing them through microscopic patterns, typically etched into the surface of the lens or member, through photolithography. Once a diffractive element is created, it may be reproduced through embossing plastic injection molding, or batch photolithographic processing.

Design of such diffractive optics is known in the art, and particular companies are available for designing such. Such diffractive optics may eliminate hotspots or places of excessive laser energy within the incoming laser beam to create a homogenous output laser beam. Additionally, such diffractive optics may be designed to blur the outer edges of the laser output beam, thereby decreasing the amplitude or power as applied to the workpiece in laser shock processing.

By altering the applied energy, particularly decreasing the amplitude of the power applied in the outer edges of the beam, a reduction of residual surface tensile stresses in the workpiece may be created. Designs and functions of diffractive elements may create any output image desired from any known input image.

Use of diffractive optics within a laser peening process enables efficient beam shaping and control of the spatial profile energy amplitude to either create a uniform laser beam from a non-uniform input laser beam or simply change the cross sectional shape of the output laser beam as compared to the input laser beam or both.

Particular input parameters necessary for design of diffractive optics are the wavelength of the input laser beam, spatial profile, cross sectional shape, and the desired output cross sectional shape along with the desired energy amplitude profile. Such diffractive optics may homogenize and defuse such beams and edges as necessary.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A laser peening apparatus for improving properties of a workpiece by providing shock waves therein, comprising:
    an energy absorbing overlay, said energy absorbing overlay being applied to the workpiece;
    a laser generator to generate a laser beam with a first cross sectional shape, said laser generator operatively associated with said energy absorbing overlay to create a shock wave on the workpiece; and
    a diffractive optic element through which said laser beam is transmitted, said diffractive optic element changing the laser beam to a second cross sectional shape.

2. The peening apparatus of claim 1 further including a demagnifying lens prior to the diffractive optic element; and
    a magnifying lens after said diffractive optic element.

3. The peening apparatus of claim 1 in which said diffractive optic element creates said second cross sectional shape to one of a rectangular shape, toroidal shape, hexagonal shape, and triangular shape.

4. The peening apparatus of claim 1 in which said diffractive optic splits said laser input beam into multiple beams.

5. The peening apparatus of claim 1 in which said diffractive optic element creates said second cross sectional shape having at least one substantially straight edge.

6. The peening apparatus of claim 1 in which the laser generator generates a laser beam with energy greater than 10 joules.

7. The peening apparatus of claim 1 in which said diffractive optic element creates a second cross sectional shape for the laser beam varying in intensity thereacross.

8. The peening apparatus of claim 1 in which said diffractive optic element maintains said first cross-sectional shape of said laser beam, but creates a second energy distribution thereacross.

9. The laser peening apparatus of claim 1, wherein said second cross sectional shape has a predetermined energy distribution.

10. The laser peening apparatus of claim 9, wherein said predetermined energy distribution is substantially homogeneous.

11. A method of improving properties of a workpiece by providing shock waves therein, comprising:
    applying an energy absorbing overlay to a workpiece;
    directing a beam of coherent energy to the workpiece to create a shock wave; and
    passing the beam of coherent energy through a diffractive optic element whereby the diffractive optic element changes the beam cross sectional shape.

12. The method of claim 11, wherein the step of passing the beam of coherent energy through a diffractive optic element changes the beam cross section to one of rectangular toroidal shape, hexagonal shape, and triangular shape.

13. The method of claim 11, wherein the step of passing the beam of coherent energy through a diffractive optic element produces a beam having a cross section of a predetermined energy distribution.

14. The method of claim 13, wherein the predetermined energy distribution is substantially homogeneous.

* * * * *